US006792327B1

(12) United States Patent
Bamford

(10) Patent No.: US 6,792,327 B1
(45) Date of Patent: Sep. 14, 2004

(54) STEREOLITHOGRAPHIC METHOD FOR COMBINING COMPONENTS OF VARYING DENSITIES

(75) Inventor: Mark D Bamford, Blackpool (GB)

(73) Assignee: Bae Systems plc, Farnborough (GB)

( * ) Notice: Subject to any disclaimer, the term of this patent is extended or adjusted under 35 U.S.C. 154(b) by 374 days.

(21) Appl. No.: 09/622,861

(22) PCT Filed: Aug. 4, 2000

(86) PCT No.: PCT/GB00/03013

§ 371 (c)(1),
(2), (4) Date: Aug. 23, 2000

(87) PCT Pub. No.: WO01/14127

PCT Pub. Date: Mar. 1, 2001

(30) Foreign Application Priority Data

Aug. 19, 1999 (GB) .............................................. 9919511

(51) Int. Cl.[7] .............................................. G06F 19/00
(52) U.S. Cl. ...................................... 700/120; 264/401
(58) Field of Search .............................. 700/117, 119, 700/120, 166, 95, 97, 98, 118, 182; 703/1; 264/401

(56) References Cited

U.S. PATENT DOCUMENTS

| 5,173,220 A | 12/1992 | Reiff et al. ................. 264/401 |
| 5,273,691 A | * 12/1993 | Hull et al. .................. 264/401 |
| 5,370,692 A | 12/1994 | Fink et al. ................... 128/898 |
| 5,491,643 A | 2/1996 | Batchelder ...................... 703/1 |
| 5,555,481 A | 9/1996 | Rock et al. .................... 419/30 |
| 5,595,703 A | 1/1997 | Swaelens et al. ........... 264/401 |
| 5,783,136 A | * 7/1998 | Enke .......................... 264/401 |
| 5,897,825 A | * 4/1999 | Fruth et al. ................. 264/401 |
| 6,051,179 A | * 4/2000 | Hagenau ..................... 264/401 |
| 6,267,919 B1 | * 7/2001 | Tanaka et al. .............. 264/401 |
| 6,540,045 B1 | * 4/2003 | Widmer et al. ............. 181/135 |
| 6,609,043 B1 | * 8/2003 | Zoia et al. .................. 700/119 |
| 6,630,093 B1 | * 10/2003 | Jones .......................... 364/401 |

FOREIGN PATENT DOCUMENTS

| EP | 0354 637 A3 | 2/1990 |
| EP | 0414215 A2 | 2/1991 |
| WO | 96 40002 A | 12/1996 |

OTHER PUBLICATIONS

Patent Abstracts of Japan vol. 013, No. 559 (M–905), Dec. 12, 1989 & 01 232024 A (Mitsui Eng & Shipbuild Co Ltd), Sep. 18, 1989 *abstract; figures*.

Patent Abstracts of Japan vol. 004, No. 180 (P–040), Dec. 12, 1980 & JP 55 124148 A (Toray Ind Inc), Sep. 25, 1980 *abstract; figures*.

* cited by examiner

*Primary Examiner*—Paul Rodriguez
(74) *Attorney, Agent, or Firm*—Nixon & Vanderhye P.C.

(57) ABSTRACT

A method of producing an article formed from a photosensitive polymer resin, the article having at least two different densities and the article being a unitary article having substantially no structural joint between regions of different density.

3 Claims, 5 Drawing Sheets

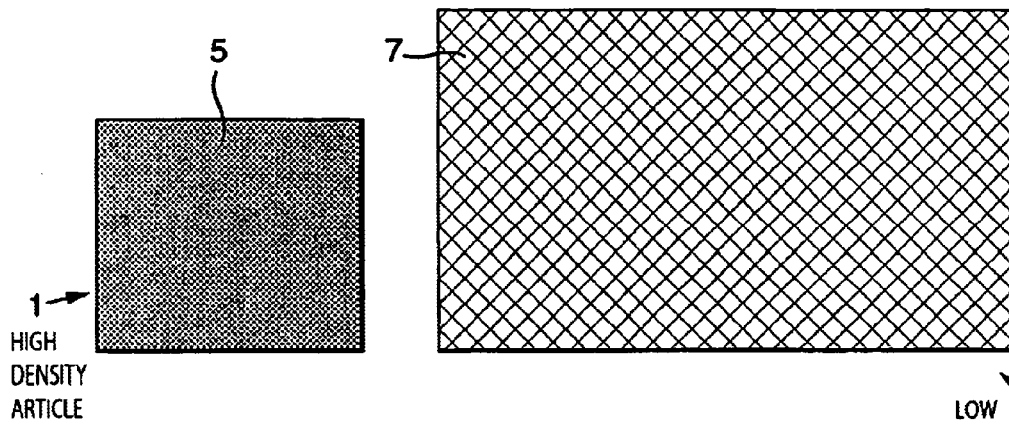
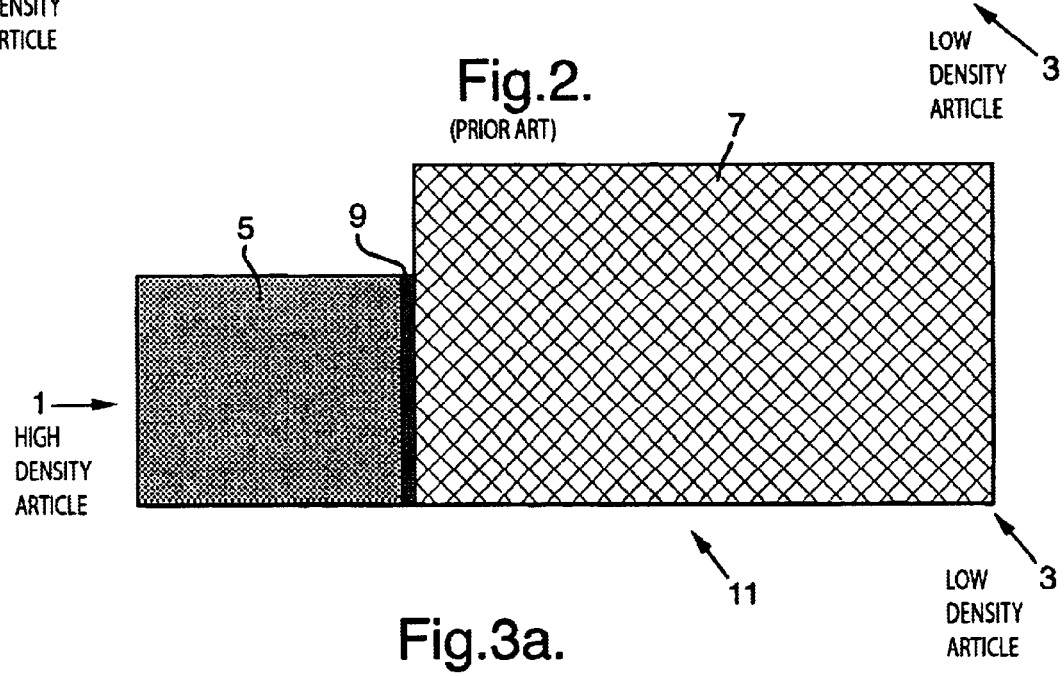
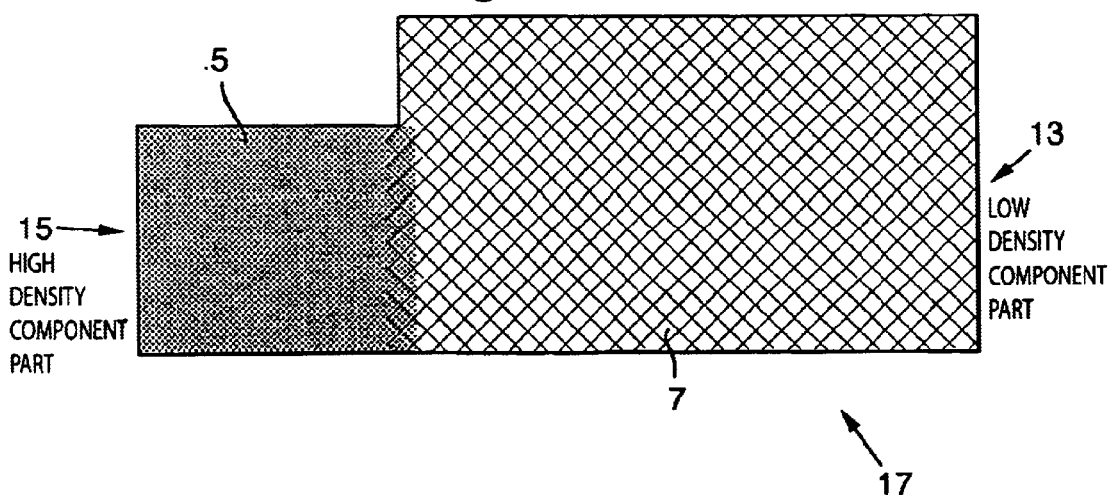

STEREOLITHOGRAPHIC METHOD FOR COMBINING COMPONENTS OF VARYING DENSITIES

The present application is a 371 U.S. national phase of PCT/GB00/03013, filed Apr. 8, 2000, the entire contents of which is hereby incorporated by reference.

BACKGROUND OF THE INVENTION

1. Field of the Invention

This invention relates to the field of stereolithography.

2. Discussion of Prior Art

Stereolithography is a process by which highly accurate solidified articles can be formed from liquid photosensitive polymer resin. When exposed to ultra violet radiation, the photosensitive resin cures to form a solid plastics material.

In a known stereolithographic process, a fine, intense ultra violet laser beam is directed on to the liquid surface of the resin. Where the beam makes contact with the resin, the resin cures to a depth of typically 0.15 mm. To allow an article to be formed by curing the resin, it is necessary to split the article into very thin sections, each of approximately 0.1 mm thickness. A movable perforated tray is placed in the resin, initially at a depth of approx 0.1 mm below the surface of the resin. The laser beam is then moved across the surface of the resin to form a solidified trail, representing a cross section of the article, leaving adjacent areas liquid. When this section of the article is completed, the perforated tray is then dipped lower into the resin allowing resin to flow through the perforations and to form a fresh layer of liquid resin which coats the upper surface of the previously solidified layer. The tray is then raised to be positioned approximately 0.1 mm deeper into the resin than for the previous section. After the resin has settled back to a flat surface, the laser beam is again directed over the liquid surface of the resin to form a second solidified cross section of the article. As the laser beam is curing the resin to form this cross section of the article it also cures this cross section onto the previous one, so that the two sections are integrated. The tray is then dipped into the resin again and positioned at a level of 0.1 mm below its position for the previous section. The surface of the resin is again cured by the laser beam and simultaneously integrated with the section below, and in this manner the article is gradually formed from the liquid resin.

This method has the advantage that the cross sections of the article are simultaneously integrated as the resin is cured and so there is no need to bond individual parts to form an article and hence there is no weak bond line which can affect the structural performance of the article. The article demonstrates the structural qualities it would exhibit if it were formed from one section rather than several bonded together.

Articles can be made by creating solid layers, which result in dense, solid articles. Alternatively articles can be made by creating less dense cross-hatched layers which result in articles with a honeycomb-like structure, known as "quickcast" articles. Quickcast articles have a structure comprising considerably more air than resin and are therefore lighter and cheaper, as much less resin is used in their manufacture. Furthermore, as less of the resin is cured during the manufacture of a quickcast article, the time taken to manufacture a quickcast article is considerably shorter than the time taken to manufacture a comparable solid article.

Software packages are available which take the design data for the article (such as a three-dimensional Computer Aided Design (CAD) model) and use the data to define cross-sectional slices of the article of approximately 0.1 mm thickness. The design information for each layer of the article may then be fed into a program which controls the movement and position of the laser beam and the tray located in the resin, so that articles can be built up accurately from the design data cross sections. Such a package which includes the slicing of the CAD data and the control of the stereolithography apparatus (including the laser beam and the tray) is commercially available under licence from 3D Systems, for example.

It is often desirable to manufacture an article which is comprised of both dense and less dense regions. An example of such an article is a model used for windtunnel testing which is required to be highly accurate in its dimensions. Such models made by traditional machining methods tend to be extremely expensive and it is hard to achieve the desired accuracy. Stereolithography provides a method of manufacture of extremely accurate articles meeting the strict requirements for windtunnel models. However, producing solid models by stereolithography is time consuming and is as expensive as traditional manufacture due to the high price of the resin. Producing these models by the alternative quickcast method can reduce the cost by approximately 50% and the time for manufacture by approximately 30% whilst maintaining the high standard of accuracy demanded. It is therefore desirable to produce such a model as a quickcast article rather than a solid one.

In some applications, such as during wind tunnel trials for example, it may be necessary to attach the model to some fixed object. The securing of models used in wind tunnel trials is traditionally achieved by drilling a hole into the rear or underside part of the model and attaching the model to a stand fixed in the wind tunnel.

However, quickcast articles cannot be drilled to allow attachment to wind tunnel stands or other articles. The material may shatter if an attempt is made to drill into it or to machine it. Solid articles, however, may be drilled into without a substantial risk of shattering.

No satisfactory method of providing a quickcast model with a solid part suitable for accurate drilling and attachment has hitherto been devised.

To produce an article having a less dense region and a denser, solid region, it has until now been necessary to produce separate components each having either less dense or dense, solid properties and then to bond these together using an adhesive resin. This produces an article which has a discernible bond line, which gives an overall weak structure to the product. In the case of models for wind tunnels, any models being made from several components bonded together are not of a sufficient strength to withstand the rigours of wind tunnel testing. They may bend at the bond line, so distorting the shape of the model under test, or may actually break at these weaker points. This structural behaviour is clearly unacceptable in any applications where the stereolithographic articles will face high stresses.

SUMMARY OF THE INVENTION

The present invention seeks to provide a method for producing a stereolithographic article, which aims to overcome the above problems associated with the adhesive bonding of less dense and denser, solid regions to make known articles.

According to the present invention there is provided a method for manufacturing a stereolithographic article comprising a plurality of components, said article having a unitary nature and at least two of the components having different densities, said method comprising the steps of:

Producing design data for said article;

Separating the design data for the article into regions of different densities, these regions forming individual components;

Loading the design data for said individual components into a software package adapted to slice the design data into thin cross sectional layers;

Positioning said individual components using said software package to form a substantially complete and accurate representation of said article, said software package enabling a user to position a number of said components within a volume, said volume representing a volume of resin from which said article is to be manufactured;

Slicing said design data for said individual components, said components being positioned to form a substantially complete and accurate representation of said article, into thin cross sectional layers;

Feeding the design data for each cross sectional layer of each of said components into a control program, said control program being adapted to control a stereolithographic apparatus comprising a laser beam and photosensitive polymer resin;

Operating said control program to produce a substantially unitary article from said components.

The components are preferably enlarged by an amount sufficient to enable an overlap with adjacent components, when positioned in said volume using said software, said overlap being at least 0.05 mm.

The overlap between adjacent components is advantageously 0.1 mm.

The article is preferably substantially of the required accuracy and size when the components are positioned to overlap adjacent components.

The cross sectional layers are preferably in the range 0.05 to 0.2 mm thick. Advantageously the cross sectional layers are 0.1 mm thick.

The unitary article produced preferably has substantially no structural joint between regions of different density. The resin used in this process is preferably liquid at room temperature and pressure and cures and solidifies on contact with ultra violet radiation.

BRIEF DESCRIPTION OF THE DRAWINGS

A specific embodiment of the invention will now be described by way of example only with reference to the following drawings:-

FIG. 1 shows a cross section through a known high density article and a known low density article produced by known stereolithographic methods.

FIG. 2 shows a cross section through a known article produced by adhesively bonding the known high density article and the known low density article of FIG. 1.

FIG. 3a shows a cross section through an article produced according to the present invention.

FIG. 3b shows the individual components of the article of FIG. 3a.

FIG. 3c shows a CAD model of the components of the article of FIG. 3a.

FIG. 3d shows a schematic diagram of a cross-section through the article of FIG. 3a.

FIG. 4b shows a plan view of the article of FIG. 4a.

DETAILED DISCUSSION OF EMBODIMENTS

Figure 3B:
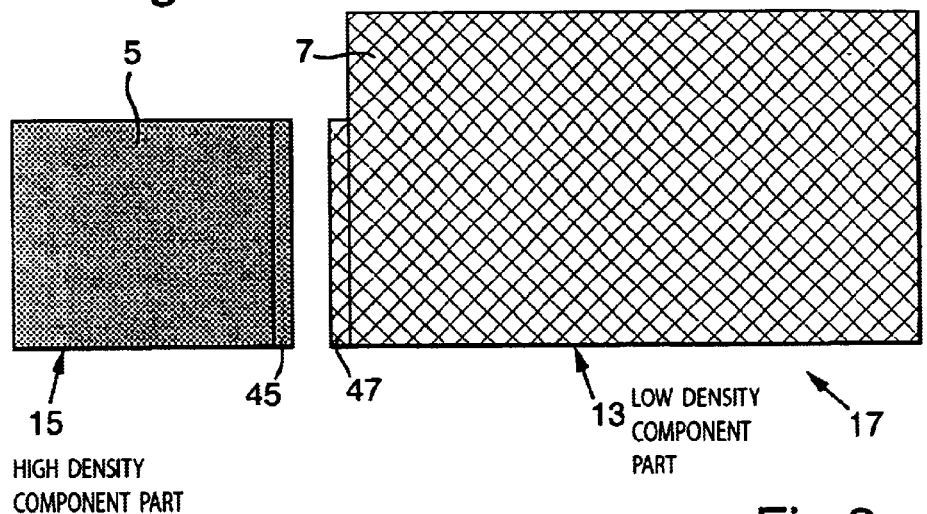

FIG. 1 shows a high density article 1 having a solid internal structure 5 and also a low density quickcast article 3 having a honeycomb-like internal structure 7.

FIG. 2 shows articles 1 and 3 joined together in the traditional manner to form article 11. The articles 1 and 3 are bonded together using a cured resin adhesive 9. Where the articles 1 and 3 are joined, the resin adhesive 9 gives rise to a bond line which is weaker than the adjacent structures 5 and 7, so reducing the strength of article 11.

FIG. 3a shows an article 17 manufactured in accordance with the present invention. It is desired that the article 17 comprises two component parts, namely a high density region 15 having a solid internal structure 5 and a low density quickcast region 13 having a honeycomb-like internal structure 7.

To manufacture the article 17, the design data for the article 17 is first generated using a standard CAD package, and the resulting CAD model of the article 17 is then divided by the operator into regions of different densities 5, 7, these regions forming individual components 15, 13 of the article 17 respectively. The components 13, 15 may be separated on the CAD model to give two components similar to those shown in FIG. 1.

The operator then adds to the CAD model an overlap layer of approximately 0.05 mm thickness to those surfaces of each component which will be located adjacent other components to form the article 17, as shown in FIG. 3b. Component 15 has an overlap layer 45 and component 13 has an overlap layer 47. This design data is then loaded into a software package, such as those produced by 3D systems, which is adapted to slice the design data into thin cross sectional layers.

Figure 3C:
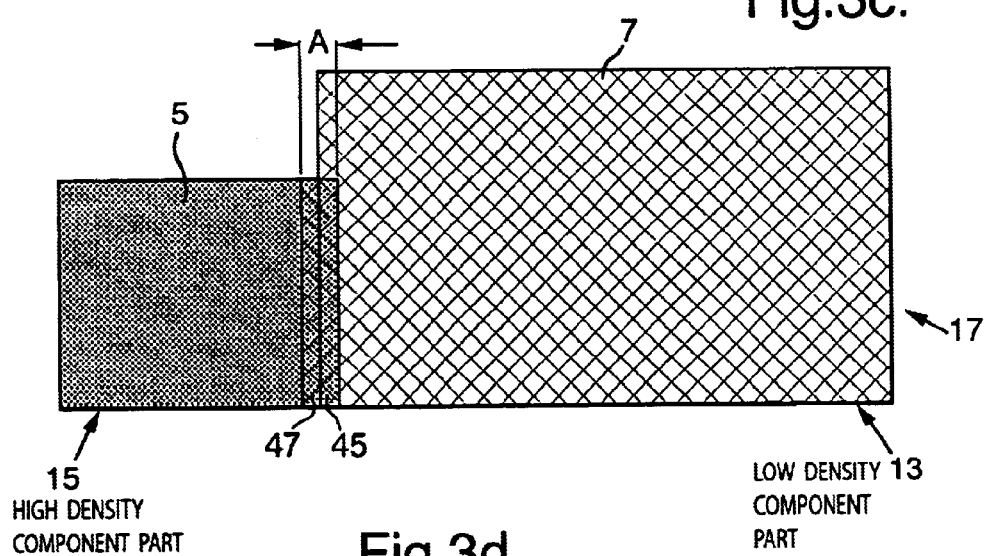

Within this software package the components 15, 13 are then arranged by the operator in a three dimensional space, to form an accurate representation of the desired article 17. The 3D space represents a volume of resin from which the article 17 is to be manufactured. The overlap layers 45, 47 of components 15, 13 respectively should extend into the body of the adjacent component 15, 13, so that there is a total overlap, indicated by the letter A on FIG. 3c, of approximately 0.1 mm between each component 15, 13 whilst maintaining the required dimensions of the article 17.

The design data for each component 15, 13 is then sliced into cross sectional layers of approximately 1 mm thickness and this information is then fed into a program for controlling stereolithographic apparatus, such as the control program produced by 3D Systems.

Figure 3D:
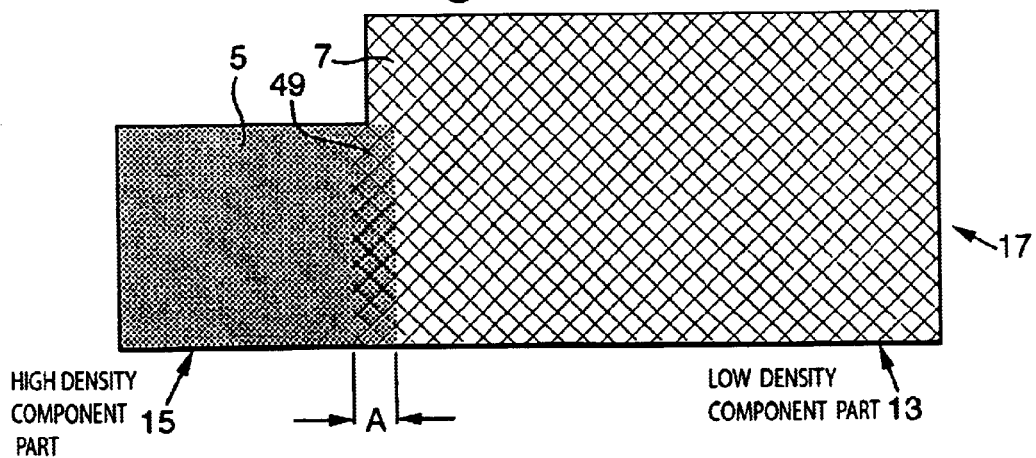

The control program operates the stereolithographic apparatus in the known manner described earlier in this specification. It enables each component 15, 13 to be separately produced, according to its design data, and in the relative position within the resin bath in which the component is found in the three dimensional space of the software package. The component 15 is created from solid layers and the component 13 from cross-hatched layers. As the components 15, 13 are designed to overlap, the article 17 is formed as a unitary article. FIG. 3d shows that individual components 15, 13, each having a different density 5, 7 respectively, may be formed such that they have an overlap of approximately 0.1 mm as indicated by the letter A. In practice, the whole of component 15 is manufactured as a solid, dense component, including the overlap layer 45. The whole of component 13 is manufactured as a low density component, including the overlap layer 47. Where the components overlap, the resin is cured twice, once to produce a solid, dense region and once to produce a quickcast region. This means Article 17 is not produced with a discernible bond line at 49. The article 17 is of the required dimensions and the article 17 is a unitary article, made without having to bond constituent parts of the article together unlike for article 11. Article 17 therefore does not have the bond line which reduces the strength of the article 11, and so the strength of the article 17 is much greater than that of article 11.

Figure 4A:
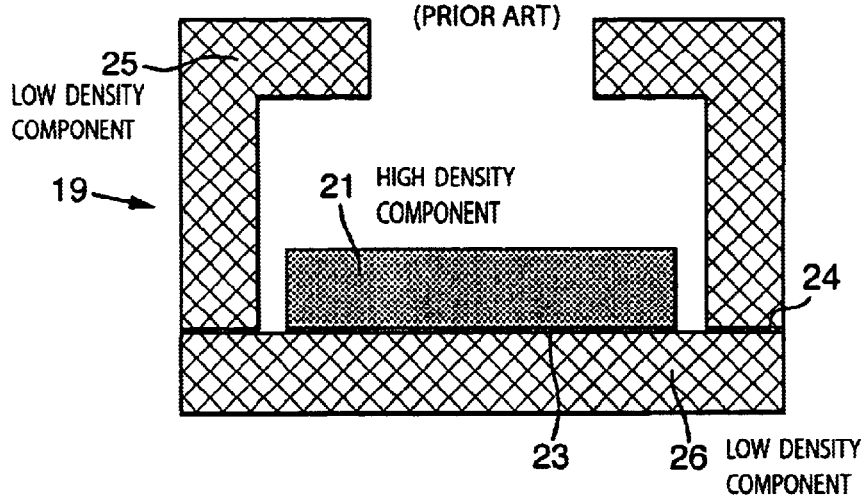
FIG. 4a shows a side cross section through a known article produced by adhesively bonding parts produced using stereolithography.
Figure 4B:
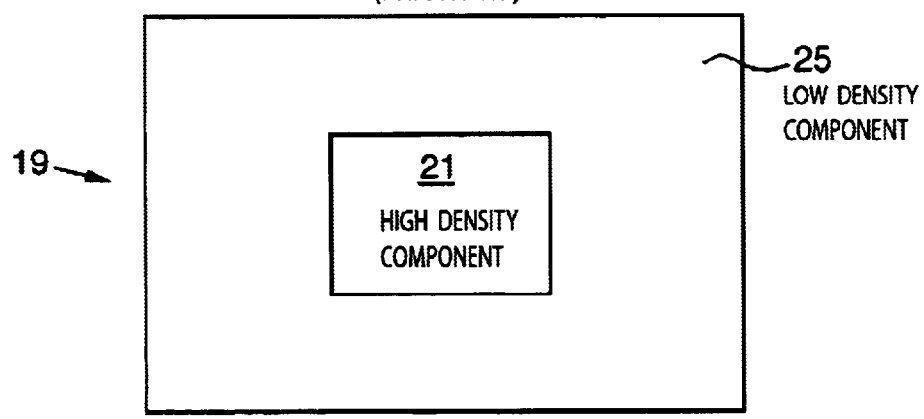

In FIGS. 4a and 4b an article 19 comprises two low density quickcast components 25, 26 and a high density solid component 21, the components 25, 26 and 21 being produced separately by traditional stereolithographic methods. The solid component 21 is required to fit inside the quickcast components 25, 26 as shown. It is relatively difficult and time consuming to manoeuvre the component 21 into place and ensure that it is firmly and accurately bonded to component 26 in the required position. Furthermore, the strength of the article is significantly lowered by the presence of the bond lines 23 and 24.

Figure 5:
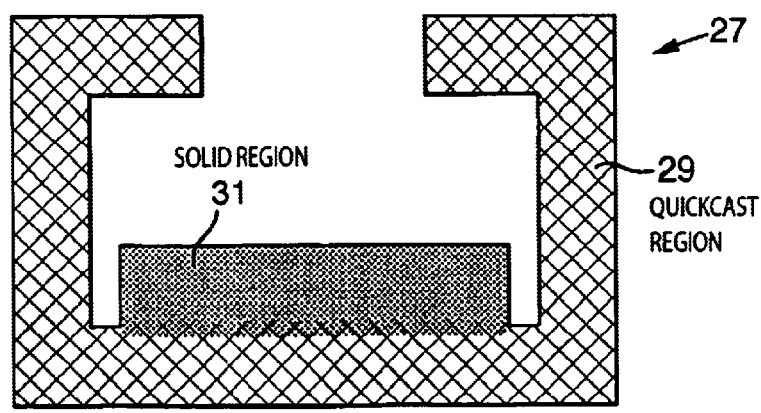
FIG. 5 shows a side cross section through an article produced according to the present invention.

FIG. 5 shows an article 27 of similar design to article 19. Article 27 however is manufactured using stereolithography according to the present invention and as described with respect to FIG. 3, the article 27 having two constituent components 31,29. The components 31 and 29 are enlarged by the operator within the CAD package, to provide overlap layers in the region where the components will be adjacent each other to form article 27. Article 27 is a unitary article having a solid region 31 and a quickcast region 29 with no bond line between these regions. Regions 31 and 29 are components manufactured during the same stereolithographic process and hence the component 31 is formed directly in the desired position, having an overlap layer extending into component 29, as the article 27 is being manufactured. This technique greatly improves the accuracy and strength of complex articles that would otherwise be very difficult and time consuming to manufacture.

Figure 6:
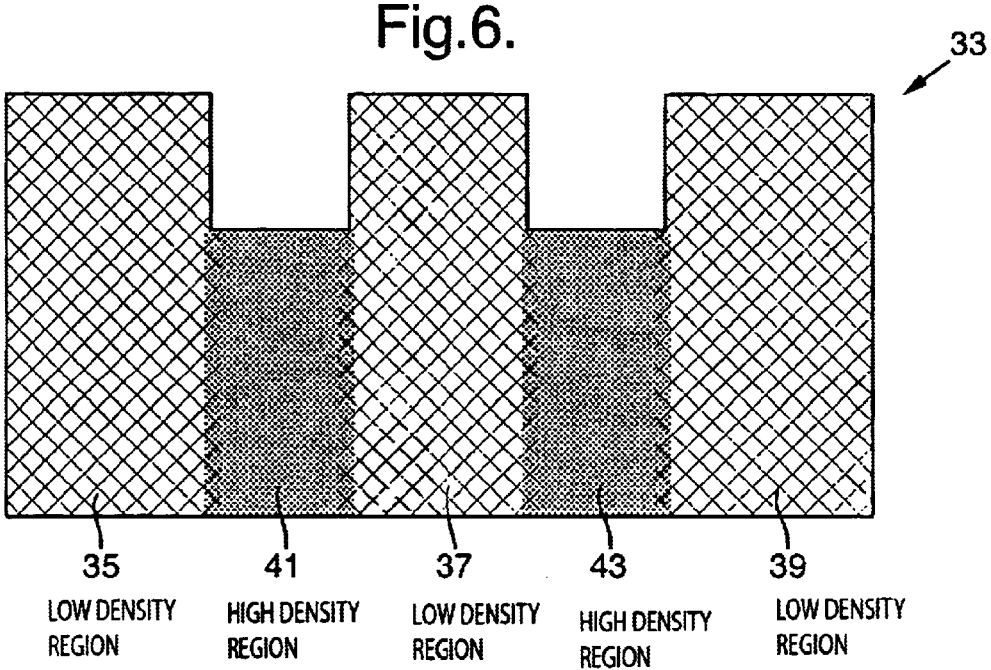
FIG. 6 shows a cross section through a further article produced according to the present invention.

FIG. 6 shows an article 33 having low density quickcast regions 35, 37, 39, these regions being separated from each other by high density solid regions 41, 43. Using traditional methods each region 35, 37, 39, 41, 43 would have been manufactured as a separate component and then adhesively bonded together to form the complex article 33. Using the method according to the present invention, and as described with respect to FIG. 3, the complex article 33 can be manufactured in one process. The regions 35, 37, 39, 41, 43 are separated by the CAD operator into components which are adjacent another component and overlap layers added to the design data for these components. The design data for the components 35, 37, 39, 41, 43 is then fed into the software package for generating cross sectional slices through the components. The components 35, 37, 39, 41, 43 are arranged to form an accurate representation of the article 33 within a three dimensional space, each overlap layer of each component of the article extending into an adjacent component. The model is then sliced into thin cross sectional layers and this information is fed into a control program for the stereolithography apparatus as described earlier. This allows the complex article 33 to be manufactured in one process, resulting in a unitary article 33 having no bond lines and therefore no corresponding structural weaknesses.

Figure 7:
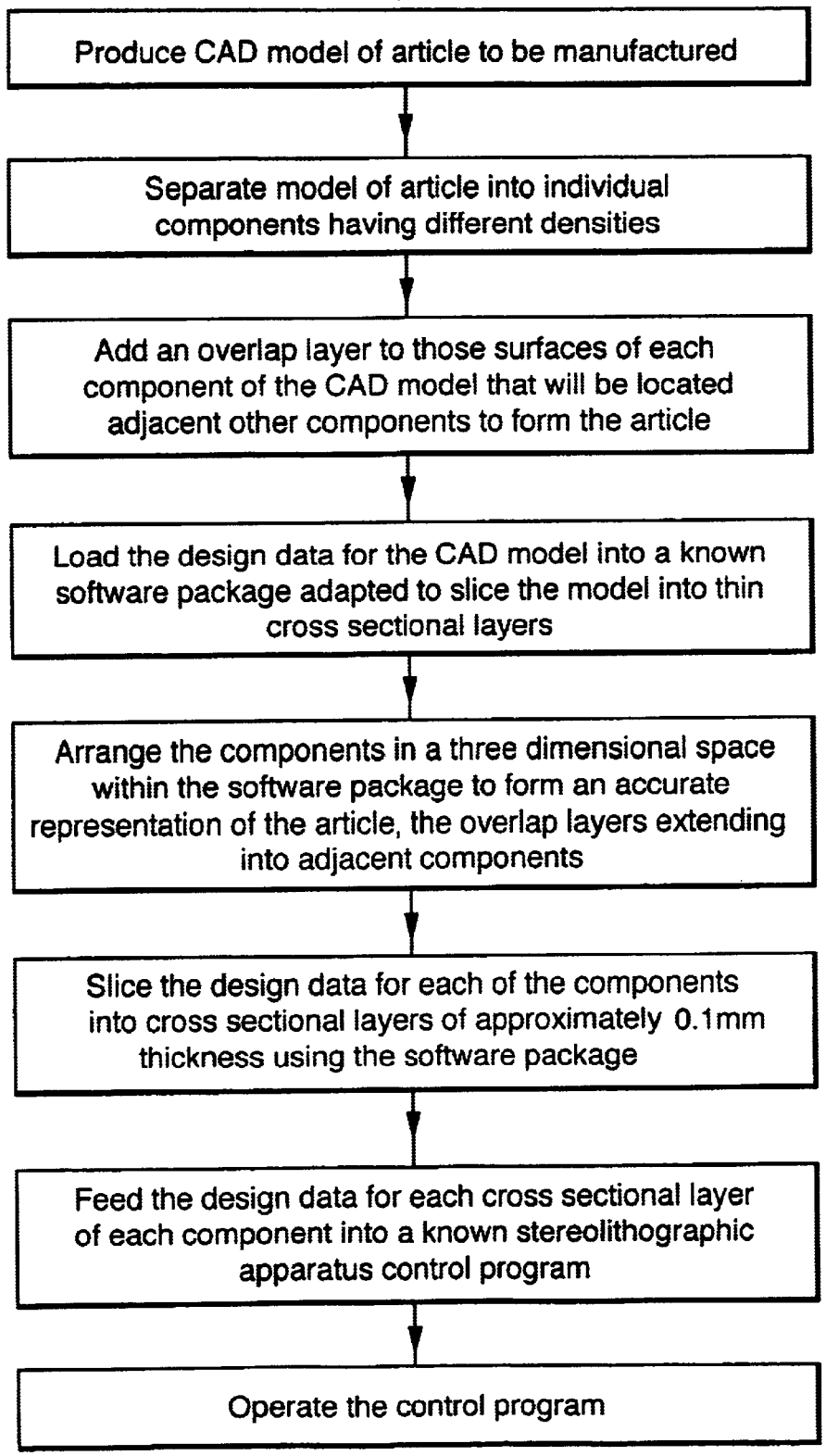
FIG. 7 shows a flow chart describing a method according to the present invention.

A method for producing articles having both dense, solid regions and less dense regions is shown in FIG. 7. The article is represented as a CAD model. The model of the article is separated into various regions, each region representing an individual component, where each component has a particular density, and adjacent components have densities different from each other. The operator adds an overlap layer to the surfaces of each component that will be located adjacent other components to form the article.

The design data for the components is then loaded into a known software package for slicing the data, and the operator arranges the components in a three dimensional space to form an accurate representation of the article within the software package, the overlap layers of each component extending into the adjacent components.

The representations of each component are then sliced into thin cross sectional layers of approximately 1 mm thickness using the software package.

The design data for each cross sectional layer of each component is then fed into a program for controlling stereolithographic apparatus. The control program operates the apparatus to produce each component, building up each component from its individual cross sectional layers in the known manner described earlier. As the components overlap in the design data, they also overlap in manufacture, so that a unitary article having no bond lines is formed from the manufacture of the individual components during a single stereolithographic process.

It will be apparent to the skilled reader from the description and drawings that articles having several densities may be produced in accordance with the present invention. The articles produced according to the present invention may be useful in many applications, including but not limited to models for casts for mould tools, wind tunnel models, and complex articles for various products including aircraft.

What is claimed is:

1. A method for stereolithographic manufacturing of a unitary article comprising a plurality of components, at least two of the components having different densities, said method comprising at least the steps of:

producing design data for said article;

separating the design data for the article into regions of different densities, these regions forming said at least two components;

loading the design data for said at least two components into a software package adapted to slice the design data into thin cross-sectional layers;

positioning said at least two components using said software package to overlap and form a substantially complete and accurate representation of said article, slicing said design data for said at least two components into thin cross-sectional layers; and controlling a stereolithographic apparatus in accordance with the design data for each of said cross-sectional layers to produce said unitary article from said plurality of components.

2. A method as claimed in claim 1 wherein said at least two components are adjacent components, further including the step of enlarging adjacent components by an amount sufficient to enable an overlap of at least 0.05 mm with said adjacent components.

3. A method as claimed in claim 2 wherein the overlap between adjacent components is 0.1 mm.

* * * * *